US011130595B2

(12) United States Patent
Diep et al.

(10) Patent No.: US 11,130,595 B2
(45) Date of Patent: Sep. 28, 2021

(54) TWISTED STRAP FOR RESTRAINING PASSENGER FLOOR LOADS

(71) Applicant: The Boeing Company, Chicago, IL (US)

(72) Inventors: Paul B. Diep, Bothell, WA (US); Bernhard Dopker, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 15/783,279

(22) Filed: Oct. 13, 2017

(65) Prior Publication Data

US 2019/0112024 A1 Apr. 18, 2019

(51) Int. Cl.
*B64C 1/18* (2006.01)
*B64F 5/00* (2017.01)

(52) U.S. Cl.
CPC . *B64F 5/00* (2013.01); *B64C 1/18* (2013.01)

(58) Field of Classification Search
CPC .... B64C 1/18; B64C 1/20; B64C 1/00; B64C 1/068; B64F 5/00; B61D 17/10
See application file for complete search history.

(56) References Cited

U.S. PATENT DOCUMENTS

| | | | | | |
|---|---|---|---|---|---|
| 1,282,090 | A | * | 10/1918 | Lemme | E04F 15/04 52/592.4 |
| 1,784,876 | A | * | 12/1930 | Marks | E04B 5/29 52/332 |
| 4,479,621 | A | * | 10/1984 | Bergholz | B64C 1/18 244/117 R |
| 4,703,908 | A | * | 11/1987 | Correge | B64C 1/18 244/118.5 |
| 7,775,478 | B2 | * | 8/2010 | Wood | B64C 1/18 244/119 |
| 8,403,261 | B2 | * | 3/2013 | Delahaye | B64F 5/10 244/118.5 |
| 8,899,522 | B2 | * | 12/2014 | Vinue Santolalla | B64C 1/064 244/119 |
| 10,023,291 | B2 | * | 7/2018 | Roborel De Climens | B64C 1/18 |

(Continued)

OTHER PUBLICATIONS

Fasteners Plus, "Simpson LTS18 18" Twist Strap—G90 Galvanized", www.fastenersplus.com/Simpson-LTS18-18-Twist-Strap-G90-Galvanized, retrieved on Oct. 3, 2017.

*Primary Examiner* — Medhat Badawi
*Assistant Examiner* — Vicente Rodriguez
(74) *Attorney, Agent, or Firm* — von Briesen & Roper, s.c.

(57) ABSTRACT

A twisted strap transfers loads generated by an aircraft passenger floor from the floor to an aircraft fuselage. The twisted strap may be formed of carbon fiber reinforced plastic, fiberglass reinforced plastic, or metal, such as aluminum, stainless steel, or titanium alloy. The twisted strap has first and second ends configured to be twisted between 40 to 120 degrees relative to the other whenever connected to a seat track and a forward-aft extending fuselage stiffener, respectively. In at least one form, the twisted strap has a length ranging from 15 to 30 inches, a width of 1 to 2 inches, and thickness of 0.1 to 0.5 inch. Each end incorporates apertures for accommodating separate connectors spaced at least four-to six diameters apart along the length of the twisted strap, and the twisted strap is configured to accommodate minimums of 9 G's of force in tension and 1.5 G's in compression.

20 Claims, 5 Drawing Sheets

(56) References Cited

U.S. PATENT DOCUMENTS

2010/0001134 A1\* 1/2010 Braeutigam ............ B64C 1/068
  244/119
2013/0092793 A1\* 4/2013 Braeutigam ............ B64C 1/068
  244/131

\* cited by examiner

TWISTED STRAP FOR RESTRAINING PASSENGER FLOOR LOADS

FIELD

The present disclosure relates generally to vehicle components designed to secure passenger floors to sidewall support structures, and more specifically to twisted straps configured to transfer both forward tensile and aft compression loads from a passenger floor to a sidewall.

BACKGROUND

Commercial aircraft have traditionally utilized metallic trusses to structurally secure passenger floor systems within passenger aircraft. Typically, the trusses have been attached to variously styled fuselage stiffeners via outboard flanges, while attached directly to seat tracks via inboard flanges. To the extent that a single truss is often employed in an aircraft to carry the load of only one seat frame bay, the use of multiple trusses has required significant numbers of fasteners. As such, there may be opportunities for cost savings associated with this aspect of aircraft construction.

As a further consideration, current federal regulations mandate that passenger floor systems of commercial aircraft transfer all flight and emergency landing loads to the aircraft fuselage shell. Moreover, modifications of traditional passenger floor structures must meet current minimum load carrying requirements of forward (tension) loads of nine (9) G's, and opposite aft (compression) loads of one and one-half (1.5) G's. Further, all components comprising any portion of the load path must minimize any occlusion of decompression venting between upper and lower portions of a fuselage monocoque, as divided by the aircraft passenger floor. As such, any structural simplification of conventional truss components must fall within stated guidelines.

SUMMARY

In accordance with one form of the present disclosure, a twisted strap having a first end, and having a second end situated opposite the first end, is configured to extend from a floor to a sidewall situated adjacent the floor. The twisted strap is configured to transfer forward and aft loads generated by the floor from the floor to the sidewall. The first and second ends of the twisted strap have rectangular cross-sections, each of the first and second ends having an angular orientation relative to the other of 40 to 120 degrees whenever the first end is connected to the sidewall and the second end is connected to the floor.

In accordance with another form of the present disclosure, a load restraint system for a floor relative to and proximal to a sidewall. The load restraint system includes a floor and a sidewall adjacent the floor, and a twisted strap having a first end, and having a second end opposite the first end. The twisted strap extends from the floor to the sidewall to transfer tensile and compression loads generated by the floor from the floor to the sidewall. The first and second ends of the twisted strap have a rectangular cross-section, and each of the first and second ends have an angular orientation relative to the other of 40 to 120 degrees whenever the first end is connected to the sidewall and the second end is connected to the floor.

In accordance with yet another form of the present disclosure, a method of assembling a twisted strap to a floor and to a sidewall situated adjacent the floor includes steps of forming a floor, a sidewall, with the sidewall situated proximal to the floor. The method further includes forming a twisted strap, the twisted strap having first and second ends; and forming at least one aperture in each of the first and second ends. The method further includes forming connectors for each aperture for transfer of tensile and compression loads from the floor to the sidewall. Finally, the method includes connecting the first and second ends of the twisted strap respectively to the floor and sidewall by inserting at least one connector into each respective aperture in a manner such that the twisted strap includes an amount of twist of 40 to 120 degrees between its first and second ends.

The features, functions, and advantages disclosed herein can be achieved independently in various forms or may be combined in yet other forms, the details of which may be better appreciated with reference to the following description and drawings.

It should be understood that referenced drawings are not necessarily to scale, and that disclosed forms are illustrated only schematically. Aspects of the disclosed forms may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined in the appended claims.

Figure 1A:
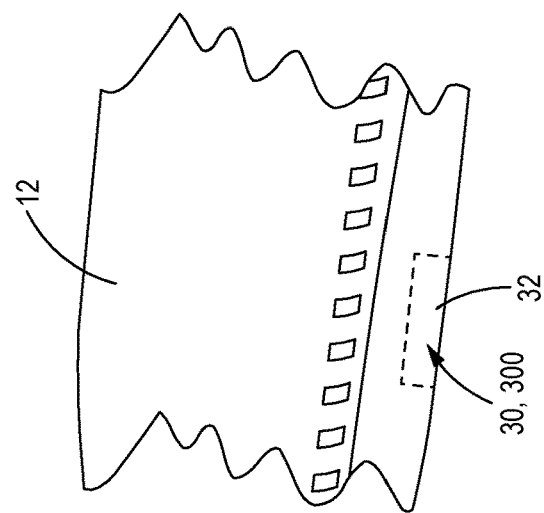
FIG. 1A is a perspective view of a portion of FIG. 1.
Figure 1:
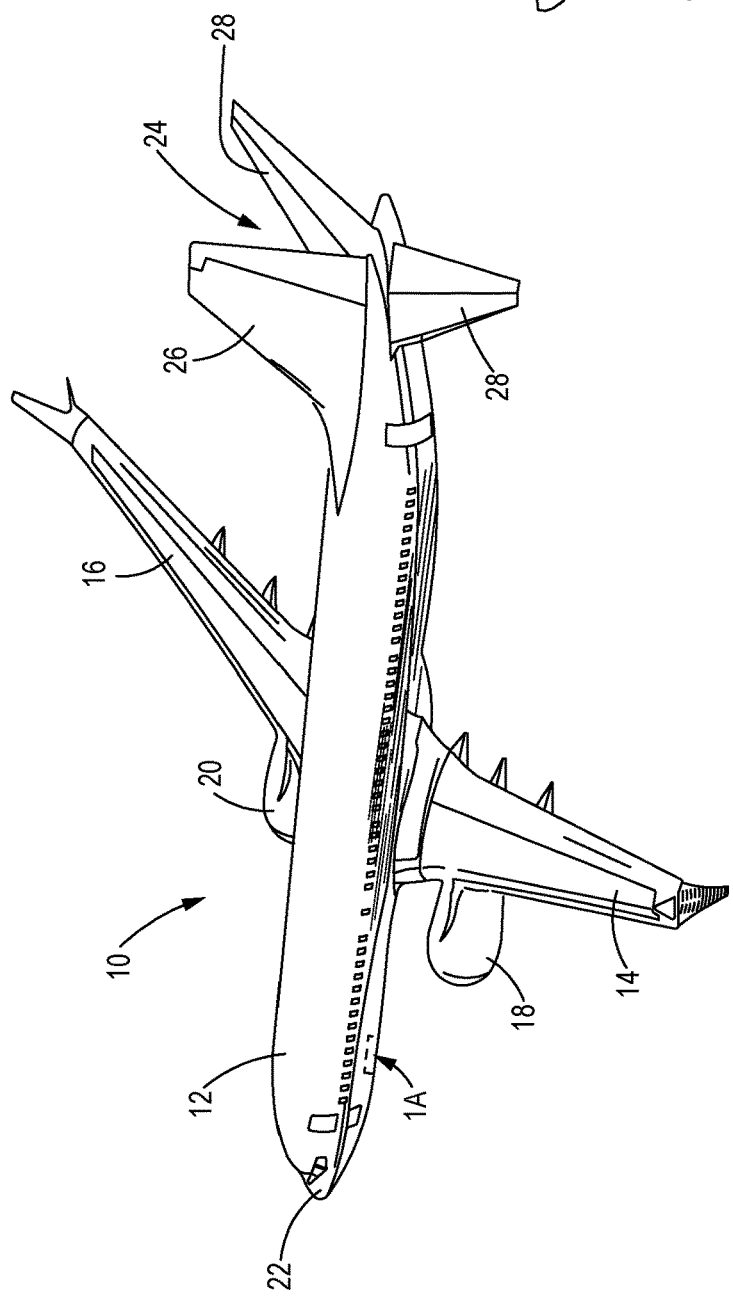
FIG. 1 is a perspective schematic view of a commercial aircraft of a type that may include a load restraint system (hidden in this view) for a passenger floor, as may be constructed in accordance with the present disclosure.

Referring initially to FIG. 1, an aircraft 10 includes a main body shell or fuselage 12, such as a monocoque airframe as shown, and a pair of wings including a left wing 14 and a right wing 16, each extending laterally, or outwardly of the fuselage 12. A left engine 18 and a right engine 20 is supported from each of the left and right wings 14, 16, respectively. The aircraft 10 includes a nose 22, and an empennage 24, including a vertical stabilizer 26 and left and right horizontal stabilizers 28, as will be appreciated by those skilled in the art.

Referring now to FIG. 1A, a portion 30 of the fuselage 12 includes a skin portion 32 such as a fiber composite fuselage designed to carry all or a major portion of loads imposed on the aircraft 10. Those skilled in the art may appreciate that this is made possible because the skin portion 32, cured to provide a fiber composite structural frame with integral stiffener components to be further described. In FIG. 1A, a load restraint system 30 is configured to transfer passenger floor component loads, in both tension and compression, to the fuselage 12 of the aircraft 10 of FIG. 1.

Figure 2:
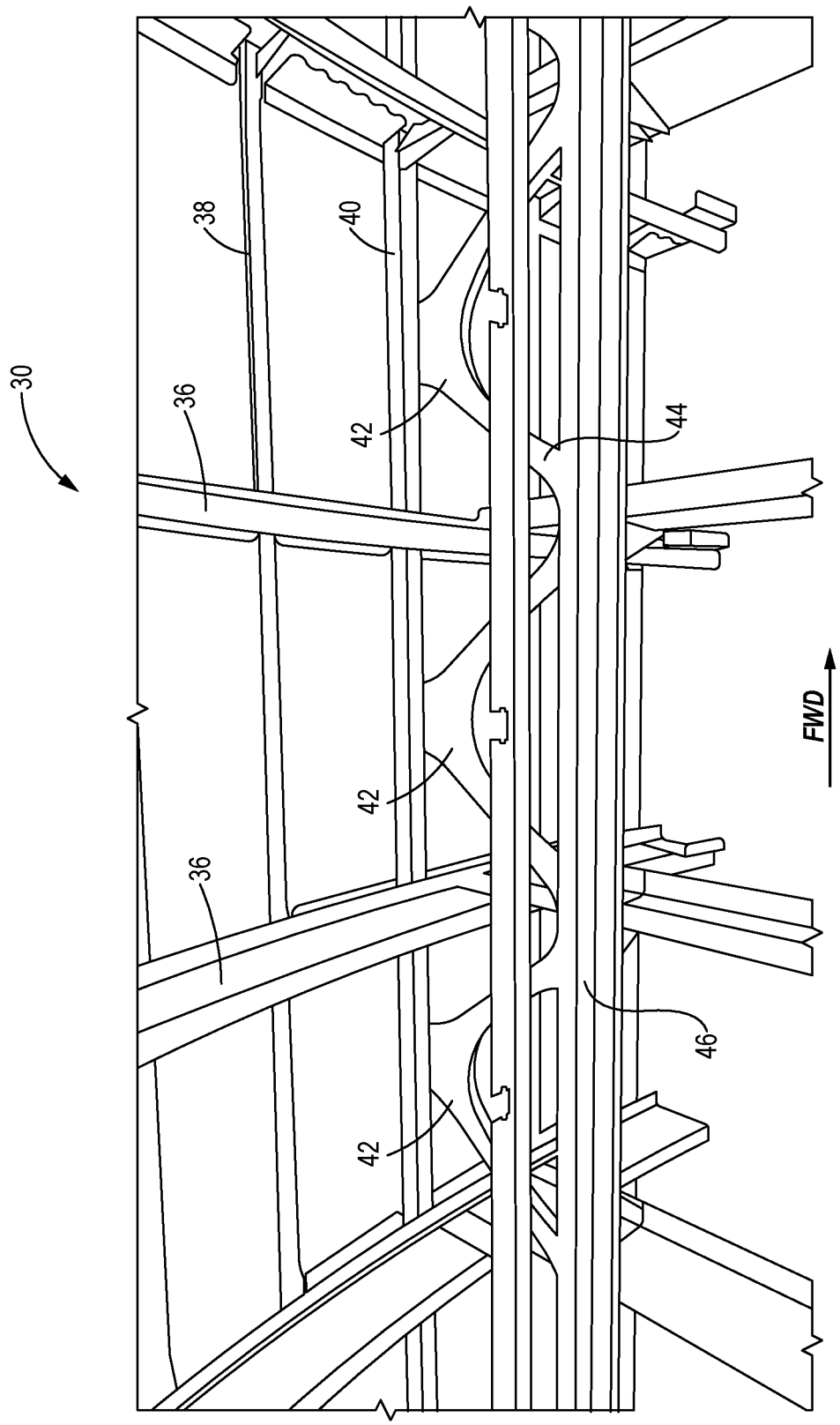
FIG. 2 is a perspective view of a load restraint system of related art.

Referring now to FIG. 2, a related art load restraint system 30 is depicted, in which vertical frame members 36 of a related art fuselage (not shown) interconnect with horizontally extending stiffeners 38; some of which may be Z-shaped, T-shaped, or J-shaped. Below the stiffeners 38, are horizontally extending T-shaped stiffeners 40 designed to support trusses 42. The shear trusses 42 are arched or boomerang shaped, and are designed to support forward and aft loads of a passenger floor (not shown in FIG. 2). The inboard ends 44 of the trusses 42 are secured to outboard seat tracks 46, as shown.

Figure 3:
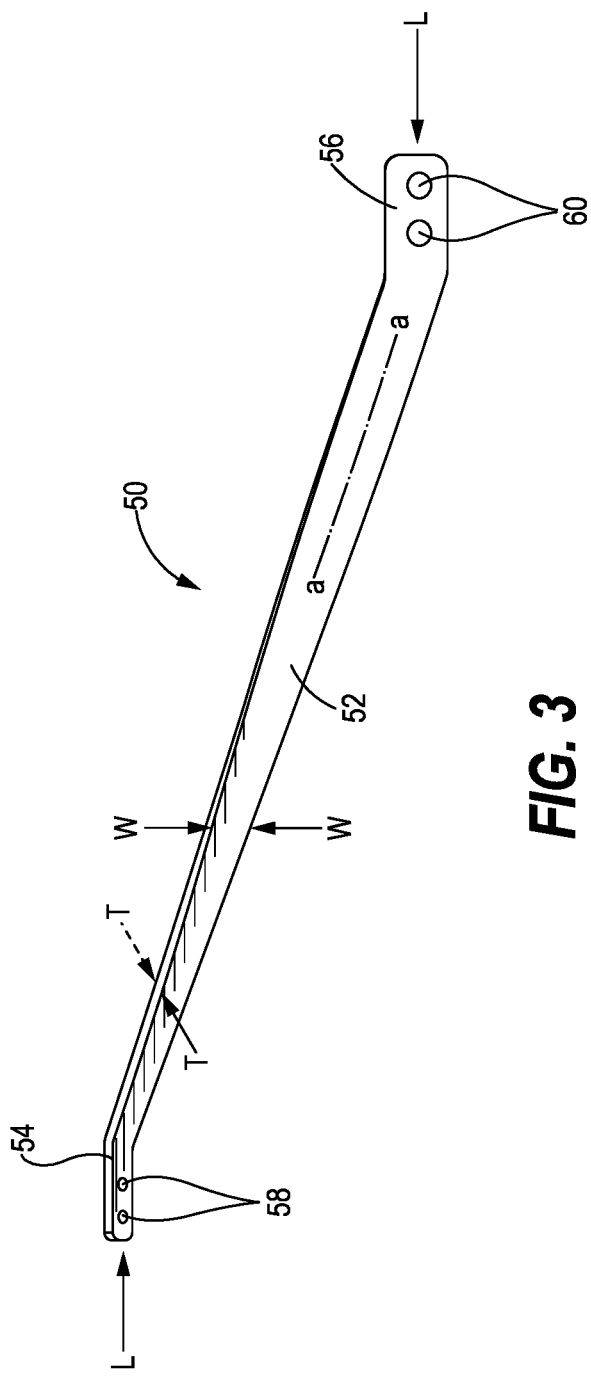
FIG. 3 is a perspective view of a twisted strap, as may be constructed in accordance with the present disclosure.

Referring to FIG. 3, a twisted strap 50 may be utilized in lieu of the described shear trusses 42, particularly for aircraft having a fuselage shell formed of a composite material, such as a carbon fiber reinforced plastic (CFRP) member. Such carbon fiber reinforced plastic may be a carbon fiber thermoplastic polymer resin or a carbon fiber thermoset polymer resin. The twisted strap 50 may also be formed of a fiberglass reinforced plastic. Either of these compositions may be formed in a reinforced plastic layup process involving a thermoplastic or thermoset polymer resin, as may be known to those skilled in the art. In one form the fibers may be oriented in various angular directions, including 0° and +/−45°, 0° and 90°, 0° and +/−60°, or any other combination of angles, relative to an longitudinal axis "a-a" (shown only partially) extending along the entire length dimension of the twisted strap 50. The twisted strap may also be formed of metal as, for example, an aluminum, stainless steel, or titanium alloy. The twisted strap 50 is defined by an elongated body 52 having a first end 54 and a second end 56 spaced from the first end 54. The elongated body 52 has a length dimension L-L, extending from end 54 to end 56, a width dimension W-W, and a thickness dimension T-T, as depicted. As disclosed herein, each of the dimensions may have values as follows: a length L-L of approximately 15 to 30 inches, a width W-W of 1 to 2 inches, and a thickness T-T of 0.1 to 0.5 inch.

The amount of twist within the elongated body 52 of the twisted strap 50 is preferably between 60 and 90 degrees about the longitudinal axis a-a from the first end 54 to the second end 56. However, the amount of twist may be such that the first end 54 and second end 56 may have an angular orientation relative to the other about the longitudinal axis a-a of 40 to 120 degrees whenever the first end 54 is connected to a sidewall 90 (FIG. 4), and the second end 56 is connected to a passenger floor, such as an aircraft passenger floor 86 (FIG. 4), situated proximal to the sidewall 90, as further described below. Such amount of twist not only permits the ends of the twisted strap to be coupled to structures that extend out of planar phase relative to one another, but also imparts a desired stiffness characteristic within the elongated body 52 of the twisted strap 50.

Figure 3A:
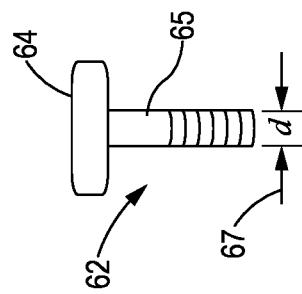
FIG. 3A is a side view of one form of a connector utilized to secure the twisted strap.

As disclosed herein, the twisted strap 50 includes at least one aperture 58, and may include at least one aperture 58, or a pair of apertures 58 at its first end 54 as depicted. Similarly, at least one aperture 60, or a pair of apertures 60 as depicted may be employed at its second end 56, the apertures provided for securement of the twisted strap 50 to structures described below. A connector 62, shown in FIG. 3A, is designed to secure the twisted strap 50 through the apertures. Each connector 62 includes a head 64, a shank 65, and each shank has a diameter of specified dimension "d", as shown.

For purposes of satisfactorily managing tensile loads potentially applied to the twisted strap 50, each set of apertures 58, 60 are spaced at least 4 to 6 diameters "d" apart from one another along ends 54, 56 of the twisted strap 50. Each connector 62 is configured to be secured by a nut, not shown.

Figure 4:
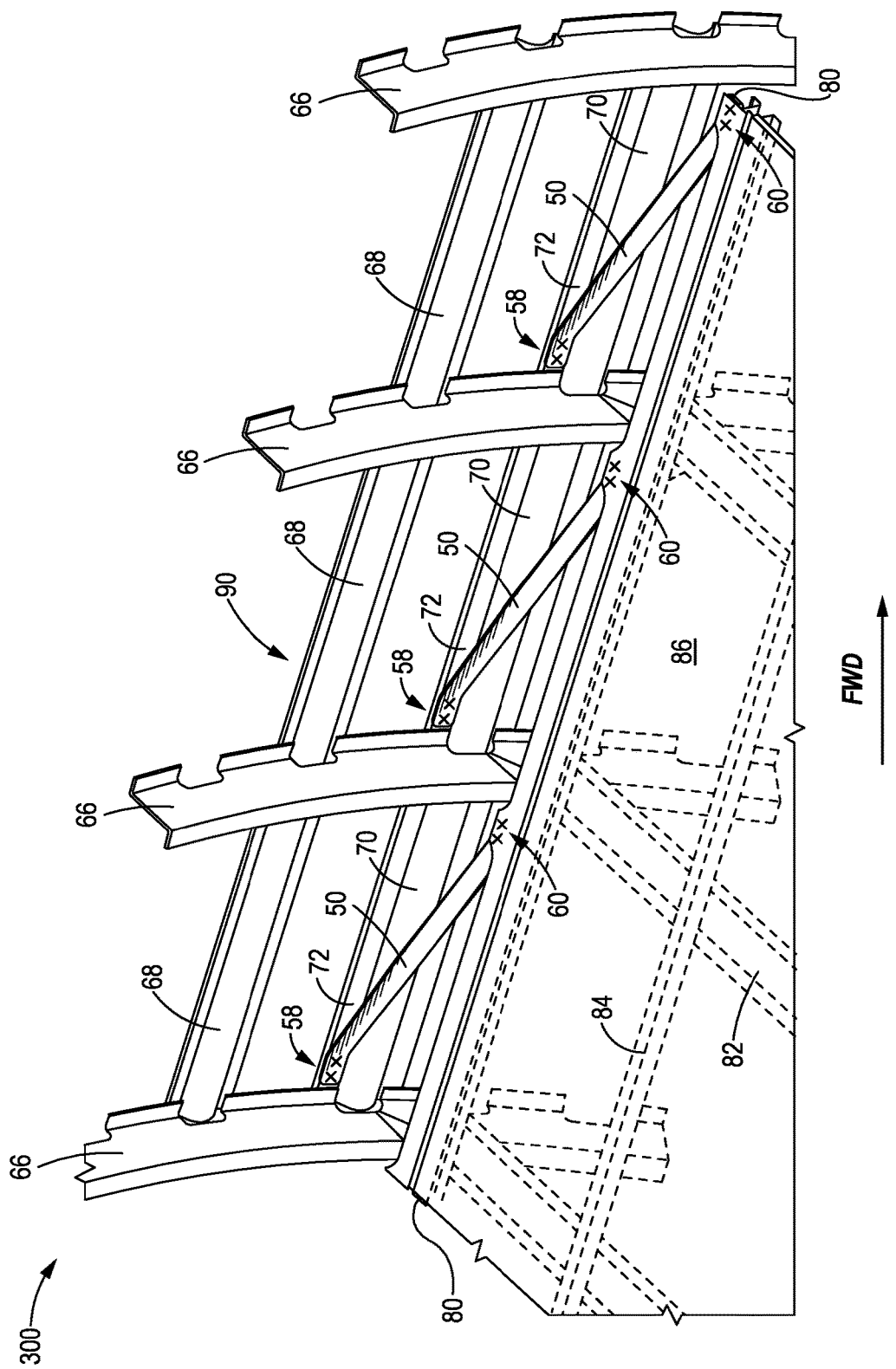
FIG. 4 is a perspective view of one exemplary form of a load restraint system employed within a fuselage shell, as may be constructed in accordance with the present disclosure.

Referring now also to FIG. 4, a plurality of twisted straps 50 are shown to be employed within an aircraft 10 to provide a load restraint system 300. The load restraint system 300 may offer savings over the described related-art load restraint system of FIG. 2, which utilizes more complex truss systems of related art requiring multiple fasteners (not shown) as earlier described. In the load restraint system 300, a robust fuselage shell may include vertical frame members 66, and at least a pair of upper and lower stiffeners, as for example a forward-aft extending fuselage stiffener 68 and a forward-aft extending fuselage stiffener 70, such as the hat-shaped stiffener shown, the vertical frame members 66 along with the upper and lower stiffeners fixed in place and then co-cured with the skin portion 32. The end 54 of the twisted strap 50 is shown attached to an upper flat edge portion 72 of the forward-aft extending fuselage stiffener 70, while the end 56 is attached to an underside of a seat track 80. In alternate embodiments, the end 54 of the twisted strap 50 may be attached directly to a thicker portion such as the hat portion of the hat-shaped stiffener instead. Further embodiments of the forward-aft extending fuselage stiffener 70 may be a T-shaped, or even I-shaped structure, as examples. In still further embodiments, the end 54 of the twisted strap 50 may be attached to one of the vertical frame members 66.

The seat track 80 may be affixed to a lateral floor support beam 82 (shown in phantom), as well as a longitudinal floor support beam 84 of a passenger floor 86 (also shown in phantom). In the disclosed load restraint system 300, each twisted strap 50 may be configured to accommodate minimums of 9 G's of force in tension, and 1.5 G's in compression, and to transfer such loads generated by the passenger floor 86 directly to the forward-aft extending fuselage stiffener 70, which constitutes a structural component of a sidewall 90 of the fuselage 12, thus providing an emergency restraint compliant with federal aviation regulations. In lieu of the seat track 80, the twisted strap 50 may alternatively be directly affixed to the lateral floor support beam 82, the longitudinal floor support beam 84, or to a reinforced floor panel (not shown), etc.

Thus, the load restraint system 300 constitutes a floor-to-sidewall load restraint system that includes both a floor and a sidewall adjacent to the floor. The disclosed load restraint system 300 incorporates a twisted strap 50 having a first end 54, and having a second end 56 opposite the first end, the twisted strap configured to extend from the floor to the sidewall to transfer tensile and compression loads generated by the floor from the floor to the sidewall, as described. The first and second ends of the twisted strap have a rectangular cross-section, and each of the first and second ends include an angular orientation of preferably 60 to 90 degrees relative to the other whenever the first end is connected to the sidewall and the second end is connected to the floor, although an expanded range of 40 to 120 degrees may be employed when expedient. As disclosed, the load restraint system 300 may be applicable to numerous environments, including passenger floor and sidewall arrangements physically located in a vehicle, and particularly in any of a number of vehicles subject to forward motion, such as an RV, car, truck, ships including all watercraft such as ocean liners, and even aircraft.

For example, in a passenger aircraft 10 of FIG. 1, each twisted strap 50 can be configured to transfer tensile and compression loads from the aircraft seat track 80 (FIG. 4), and ultimately from the passenger floor 86, to the integrally reinforced skin portion 32 of the fuselage 12 (FIG. 1). In this disclosed aircraft 10, the components of the load restraint system 300 would at least include the twisted strap 50, connectors 62, the forward-aft extending fuselage stiffener 70 of the sidewall 90, and the passenger floor 86.

As earlier noted, materials for manufacturing the twisted strap may include a fiber reinforced plastic or a fiberglass reinforced plastic, or metal alloys such as, for example, aluminum and titanium alloys. One method of making a twisted strap for use in an emergency load restraint system 300 includes forming a strap having first and second ends longitudinally spaced apart, and connecting the first end to a passenger floor seat track, and the second end to a forward-aft extending stiffener of an aircraft fuselage shell. The method includes configuring the twisted strap to transfer tensile and compression loads between the first and second ends, and includes the steps of:

forming a composite member such as a carbon fiber reinforced plastic member to extend between an aircraft seat track of a commercial passenger floor and a composite aircraft fuselage;

configuring the composite member to carry tensile and compression loads between the seat track and the composite aircraft fuselage;

configuring the composite member to fit between the seat track and fuselage by forming an angular orientation of between 60 to 90 degrees between the first and second ends of the member; and configuring the first end of the composite member to be connected to the seat track, and the second end to be connected to a forward-aft extending stiffener of the aircraft fuselage.

Figure 5:
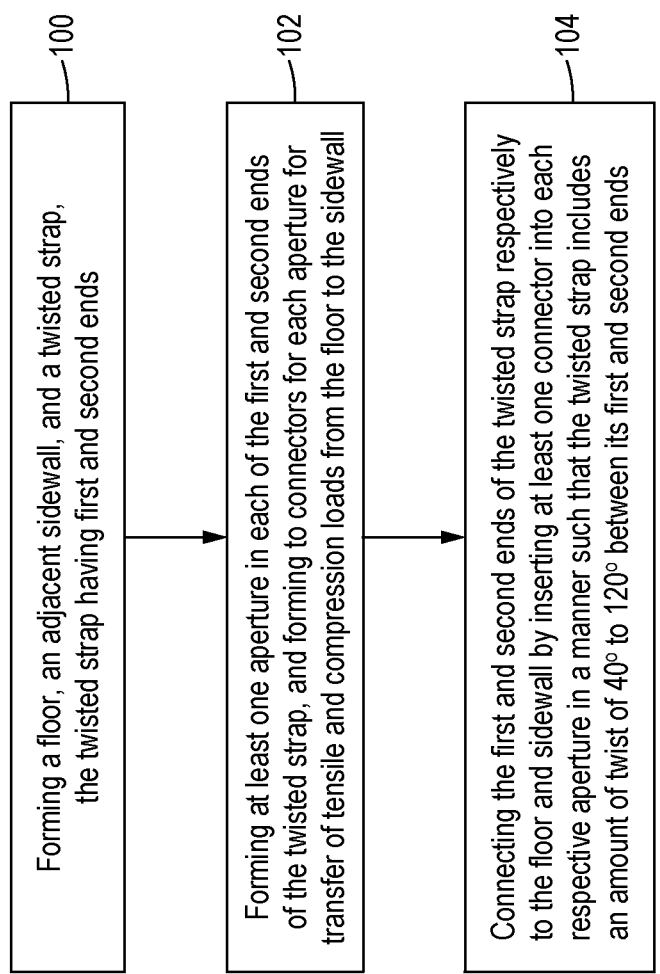
FIG. 5 is a flow chart, exemplifying a method of assembly of a twisted strap to various vehicle components via connectors.

Finally, referring now to FIG. 5, a flow chart is provided that outlines a method of assembling the twisted strap to a sidewall 90 proximal to the floor 86. The method includes Step 100 of forming a floor 86, an adjacent sidewall 90, and a twisted strap 50, the twisted strap having first and second ends 54, 56. The method further includes step 102 of forming at least one aperture 58, 60 at each of the first and second ends 54, 56 of the twisted strap 50, and forming connectors 62 for each aperture 58, 60 for transfer of tensile and compression loads from the floor 86 to the sidewall 90. Finally, the method includes step 104 of connecting the first and second ends 54, 56 of the twisted strap 50 respectively to the floor 86 and sidewall 90 by inserting at least one connector 62 into each respective aperture 58, 60 in a manner such that the twisted strap 50 includes an amount of twist of 40 to 120 degrees between its first and second ends 54, 56.

The disclosed form of the twisted strap 50 may have other variations and alternative constructions neither described nor suggested herein. For example, and as already exemplified, instead of a twist of 60 to 90°, the amount of twist within the twisted strap 50 may be of a lesser or greater amount; e.g. from 40° up to 120°, when connected to the described structures. In addition, other types and styles of connectors may be employed in lieu of the connector 62. Finally, although various specific structures, shapes, and components have been described and depicted, numerous other configurations and/or other components may be utilized, and potentially in other environments, as may be appreciated by those skilled in the art.

What is claimed is:

1. A twisted strap having an elongated body with a longitudinal axis, a first end, and a second end situated longitudinally opposite the first end, the twisted strap configured to extend from an aircraft passenger floor to an aircraft sidewall situated adjacent the aircraft passenger floor, and configured to transfer forward-aft loads generated by the aircraft passenger floor from the aircraft passenger floor to the aircraft sidewall;

wherein the twisted strap is designed and configured to accommodate a greater force in tension than in compression, including at least a minimum of 9 G's of force in tension and at least 1.5 G's in compression, and the first and second ends of the twisted strap have rectangular cross-sections, the elongated body twisted about the longitudinal axis such that the first and second ends have an angular orientation relative to each other about the longitudinal axis of 40 to 120 degrees whenever the first end is connected to the aircraft sidewall and the second end is connected to the aircraft passenger floor;

wherein the aircraft sidewall includes a forward-aft extending stiffener and the first end of the twisted strap is attached directly to the forward-aft extending stiffener; and wherein the second end of the twisted strap is attached directly to the aircraft passenger floor or to a seat track.

2. The twisted strap of claim 1, wherein the forward-aft extending stiffener is fixed to an aircraft fuselage, and wherein the twisted strap is formed of a carbon fiber reinforced plastic.

3. The twisted strap of claim 1, wherein the forward-aft extending stiffener is fixed to an aircraft fuselage, wherein the stiffener is hat-shaped, having a flat edge portion and a hat portion, and wherein the twisted strap is formed of a fiberglass reinforced plastic.

4. The twisted strap of claim 1, having a length of 15 to 30 inches, a width of 1 to 2 inches, and a thickness of 0.1 to 0.5 inch.

5. The twisted strap of claim 1, wherein each of the first and second ends includes at least one aperture to accommodate one connector.

6. The twisted strap of claim 2, wherein the carbon fiber reinforced plastic is a thermoplastic polymer resin or a thermoset polymer resin.

7. The twisted strap of claim 3, wherein the fiberglass reinforced plastic is a thermoplastic polymer resin or a thermoset polymer resin.

8. The twisted strap of claim 2, wherein some carbon fibers of the carbon fiber reinforced plastic are oriented in various angular directions, including 0° and +/−45°, 0° and 90°, 0° and +/−60°, relative to the longitudinal axis extending along the twisted strap.

9. A load restraint system for an aircraft passenger floor proximal to an aircraft sidewall, the load restraint system comprising:

an aircraft passenger floor, and an aircraft sidewall adjacent the aircraft passenger floor;

a twisted strap having an elongated body with a longitudinal axis, a first end, and a second end opposite the first end, the twisted strap configured to extend from the aircraft passenger floor to the aircraft sidewall to transfer tensile and compression loads generated by the aircraft passenger floor from the aircraft passenger floor to the aircraft sidewall;

wherein the twisted strap is designed and configured to accommodate a greater force in tension than in compression, including at least a minimum of 9 G's of force in tension and at least 1.5 G's in compression, and the first and second ends of the twisted strap have a rectangular cross-section, the elongated body twisted about the longitudinal axis such that the first and second ends have an angular orientation relative to each other about the longitudinal axis of 40 to 120 degrees whenever the first end is connected to the aircraft sidewall and the second end is connected to the aircraft passenger floor;

wherein the aircraft sidewall includes a forward-aft extending stiffener and wherein the first end of the twisted strap is attached directly to the forward-aft extending stiffener; and wherein the second end of the twisted strap is attached directly to the aircraft passenger floor or to a seat track.

10. The load restraint system of claim 9, the forward-aft extending stiffener is fixed to an aircraft fuselage, and wherein the twisted strap is formed of a carbon fiber reinforced plastic.

11. The load restraint system of claim 9, wherein the forward-aft extending stiffener is fixed to an aircraft fuselage, wherein the stiffener is hat-shaped, having a flat edge portion and a hat portion, and wherein the twisted strap is formed of a fiberglass reinforced plastic.

12. The load restraint system of claim 9, wherein the twisted strap has a length of 15 to 30 inches, a width of 1 to 2 inches, and a thickness of 0.1 to 0.5 inch.

13. The load restraint system of claim 9, wherein each of the first and second ends includes at least one aperture to accommodate one connector.

14. The load restraint system of claim 9, further comprising a plurality of twisted straps.

15. The load restraint system of claim 10, wherein the carbon fiber reinforced plastic is a thermoplastic polymer resin or a thermoset polymer resin.

16. The load restraint system of claim 11, wherein the fiberglass reinforced plastic is a thermoplastic polymer resin or a thermoset polymer resin.

17. A method of assembling a twisted strap to an aircraft passenger floor and to an aircraft fuselage sidewall situated adjacent the aircraft passenger floor; the method comprising steps of:

a. forming an aircraft passenger floor, an aircraft fuselage sidewall, the aircraft fuselage sidewall situated proximal to the aircraft passenger floor, and forming a twisted strap to accommodate a greater force in tension than in compression, including at least a minimum of 9 G's of force in tension and at least 1.5 G's in compression, the twisted strap having an elongated body with a longitudinal axis, a first end and a second end situated longitudinally opposite the first end;

b. forming at least one aperture in each of the first and second ends of the twisted strap, and forming connectors for each aperture for transfer of tensile and compression loads from the aircraft passenger floor to the aircraft fuselage sidewall;

c. connecting the first and second ends of the twisted strap respectively to the aircraft passenger floor and aircraft fuselage sidewall by inserting at least one connector into each respective aperture, wherein the elongated body of the twisted strap is twisted about the longitudinal axis such that the first and second ends have an angular orientation relative to each other about the longitudinal axis of 40 to 120 degrees;

d. forming the aircraft fuselage sidewall to include a forward-aft extending stiffener; and e. directly attaching the first end of the twisted strap to the forward-aft extending stiffener, and directly attaching the second end of the twisted strap to the aircraft passenger floor or to a seat track.

18. The load restraint system of claim 10, wherein some carbon fibers of the carbon fiber reinforced plastic are oriented in various angular directions, including 0° and +/−45°, 0° and 90°, 0° and +/−60°, relative to the longitudinal axis extending along the twisted strap.

19. The twisted strap of claim 1, wherein the second end of the twisted strap is attached to an underside of the aircraft passenger floor.

20. The load restraint system of claim 9, wherein the second end of the twisted strap is attached to an underside of the aircraft passenger floor.

* * * * *